United States Patent Office 3,419,664
Patented Dec. 31, 1968

3,419,664
COMPOSITIONS AND METHODS FOR TREATING PAIN WITH SUBSTITUTED UREAS
Wilhelm Frick, Pfeffingen, Basel-Land, Switzerland, assignor to Geigy Chemical Corporation, Greenburgh, N.Y., a corporation of Delaware
No Drawing. Original application Mar. 24, 1965, Ser. No. 442,537, now Patent No. 3,344,181, dated Sept. 26, 1967. Divided and this application Jan. 10, 1967, Ser. No. 620,202
Claims priority, application Switzerland, Mar. 26, 1964, 3,977/64
8 Claims. (Cl. 424—322)

ABSTRACT OF THE DISCLOSURE

Method of and composition for treating pain utilizing as the active ingredient N'-methyl- or N'-ethyl-N-(2-chloro-5-trifluoromethylphenyl)urea.

---

This application is a divisional of S.N. 442,537, filed Mar. 24, 1965, now U.S. Patent No. 3,344,181, granted Sept. 26, 1967.

The present invention concerns new substituted ureas which have valuable pharmacological properties.

It has been found that substituted ureas, which have not been known up to now, of Formula I

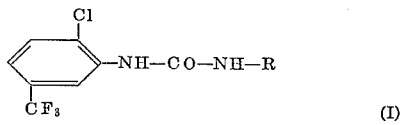

wherein R represents a lower alkyl radical, in particular the methyl or ethyl radical, have excellent analgesic and also antiphlogistic, antipyretic, sedative and anaesthesia-potentiating activity.

There are various ways of producing these new compounds. For example, the compounds of Formula I are produced by reacting 2-chloro-5-trifluoromethyl phenyl isocyanate (isocyanic acid - [α,α,α - trifluoro-6-chloro-m-tolyl]ester) or a reactive functional derivative or 2-chloro-5-trifluoromethyl phenyl carbamic acid (2-chloro-5-trifluoromethyl-carbanilic acid), in particular a lower alkyl ester, the phenyl ester, the amide, N-nitroamide, N-acetylamide, N,N-diphenylamide, or, in the presence of an acid binding agent, the chloride thereof with a lower alkylamine. The method of the reaction depends on the starting materials used. For example, reactions with 2 - chloro - 5 - trifluoromethyl phenyl isocyanate are performed at temperatures between 0° and 100°. The reaction components can be used in equimolecular amounts or an excess of one component, in particular of an amine, can be chosen. The components may be added in any order desired but preferably the isocyanate is added to the amine.

Benzene, toluene, chlorobenzene, chloroform, carbon tetrachloride, acetone, acetonitrile, tetrahydrofuran or dioxan can serve as solvent or diluent for both reaction components; also alcohols or water can serve for the amines.

Reactions with low alkyl esters, the phenyl ester or the N,N-diphenylamide of 2-chloro-5-trifluoromethyl phenyl carbaminic acid can be performed at temperatures between 0 and 250° in the absence of solvents or in one of the solvents given above with the exception of water. Reactions with the N-nitroamide, i.e. with N-(2-chloro-5-trifluoromethyl-phenyl)-N'-nitro-urea, are performed, for example, in water or in an aqueous-organic medium such as dioxan/water, at the boiling point thereof. Reactions with the amide are performed at temperatures up to about 200° and, if desired, glacial acetic acid or phenol for example can be used as solvent. A temperature range between 0° and 150° is used for the reactions of 2-chloro-5-trifluoromethylphenyl carbamoyl chloride with low alkylamines. In such reactions, for example, one of the solvents given above with the exception of water can be used as solvent and, as acid binding agent, an excess of the amine to be reacted or a tertiary organic base such as triethylamine, dimethyl aniline or pyridine, or, finally, an inorganic base such as sodium hydroxide, sodium or potassium carbonate, can be used.

Compounds of general Formula I are produced by a second related process by reacting a low alkyl isocyanate or a reactive functional derivative of a low alkyl carbamic acid, in particular a low alkyl ester, the phenyl ester, the amide, N-nitroamide, an N-alkylamide or N-nitroso-N-alkylamine (i.e. an N,N'-dialkyl urea or an N,N'-dialkyl-N-nitroso urea having two identical low alkyl radicals, an N-acylamide, the N,N-diphenylamide or, in the presence of an acid binding agent, the chloride thereof, with 2-chloro-5-trifluoromethyl aniline (α,α,α-trifluoro-6-chloro-m-toluidine). These reactions can also be performed under the conditions given in the first process for the isocyanate or the corresponding carbamic acid derivatives.

The isocyanates and N-substituted, reactive carbamic acid derivatives necessary for the two above processes can be produced, insofar as they are not already known, completely analogously to the known aromatic or aliphatic isocyanates or carbamic acid derivatives. Particularly the carbamic acid chlorides which can easily decompose, but also isocyanates and carbamic acid esters can also be produced immediately before the reaction according to the invention from 2-chloro-5-trifluoromethyl aniline or a low alkylamine and phosgene, or from a chloroformic acid alkyl ester or phenyl ester respectively in the known manner and the crude products formed, optionally in the same reaction medium, can be reacted directly with a low alkylamine or with the 2-chloro-5-trifluoromethyl aniline respectively.

A third process for the production of compounds of the general Formula I consists in converting an N-(2-chloro-5-trifluoromethyl-phenyl)-N'-alkyl thiourea containing a low alkyl radical directly or by way of the corresponding N,N'-disubstituted carbodiimide into the corresponding N - (2-chloro-5-trifluoromethylphenyl)-N'-alkyl urea. Suitable oxidising agents for performing the first variation of the process are, e.g. sodium peroxide in alkaline/aqueous solution, potassium ferric cyanide, ferric chloride, potassium permanganate, sodium or potassium hypochlorite in aqueous or aqueous/organic medium. Mercury oxide, for example in an inert organic solvent such as, e.g. benzene, is a suitable reactant for the first step of the second variation of the process. The addition of the elements of water to the carbodiimide-intermediate can be easily achieved by treatment with water or with a mixture of water and an organic solvent miscible therewith such as tetrahydrofuran or dioxan. The process is more simply performed in one step, i.e. the thiourea is treated with mercury oxide or, in this case, e.g. also lead oxide or other heavy metal compounds, in an aqueous organic solvent, e.g. in aqueous ethanol. Depending on the reactivity of the reactants used and the boiling temperature of any solvents or diluents used, the above reactions are performed at temperatures between 0 and 250°. The thioureas necessary as starting materials are produced, for example analogously to the first or second processes given above using isothiocyanates (mustard oils) instead of the corresponding isocyanates.

A fourth process for the production of compounds of the general Formula I is characterised by converting an N - (2 - chloro - 5 - trifluoromethyl - phenyl) - N' - alkyl guanidine containing a low alkyl radical into the corresponding urea by acid or alkaline hydrolysis or by treatment with nitrous acid. The hydrolysis can be performed, e.g. with dilute, aqueous acids or bases such as hydrochloric acid, sulphuric acid or sodium hydroxide solution, at temperatures between 0° and 150°. Treatment with nitrous acid, for example with solutions of alkali nitrite in at least the equimolar amount of dilute hydrochloric acid, is performed at temperatures between 0° and 80°. The guanidines necessary as starting materials can be produced by methods known per se, cf. for example Houben-Weyl, 4th edition, vol. VIII, pp. 180–188.

Finally, compounds of the general Formula I are also obtained by a process related to the first process by reacting 2-chloro-5-trifluoromethyl-phenyl isocyanate or a reactive functional derivative of 2-chloro-5-trifluoromethyl carbamic acid which is converted thereinto by heating, in particular the amide, N,N-diphenylamide or chloride, with a low alkanoic acid-N-alkyl-amide, in particular with a low N-alkyl formamide or N-alkyl-acetamide and hydrolysing the N - (2 - chloro - 5 - trifluoromethyl - phenyl) - N' - alkyl-N'-alkaroyl urea so formed into the corresponding N,N'-disubstituted urea of the general Formula I. The hydrolysis can be performed, e.g. with aqueous acids or bases on heating.

The new compounds are administered, in particular, orally or rectally. The daily dosages vary between 50 and 1000 mg. for adult patients. Suitable dosage units such as dragées (sugar coated tablets), tablets or suppositories preferably contain 25–500 mg. of an active substance according to the invention.

Dosage units for the peroral administration contain, as active substance, preferably between 5 and 90% of a compound of the general Formula I. They are produced by combining the active substance with, e.g. solid, pulverulent carriers such as lactose, saccharose, sorbitol, mannitol; starches such as potato starch, maize starch or amylopectin, also laminaria powder or citrus pulp powder; cellulose derivatives or gelatines, optionally with the addition of lubricants such as magnesium or calcium stearate or polyethylene glycol (carbowaxes) of suitable molecular weights, to form tablets or dragée cores. The latter are coated, for example, with concentrated sugar solutions which can also contain gum arabic, talcum and/or titanium dioxide, or with a lacquer dissolved in easily volatile organic solvents or mixtures of solvents.

Examples of dosage units for rectal administration are, e.g., suppositories consisting of a combination of an active substance with a neutral fatty base, or also gelatine rectal capsules containing a combination of an active substance produced according to the invention with polyethylene glycols (carbowaxes) of suitable molecular weight.

The following methods further illustrate the production of tablets and dragées:

(a) 250 g. of N-(2-chloro-5-trifluoromethyl-phenyl)-N'-methyl urea are mixed with 175.80 g. of lactose and 169.70 g. of potato starch, the mixture is moistened with an alcoholic solution of 10 g. of stearic acid and granulted through a sieve. After drying, 160 g. of potato starch, 200 g. of talcum, 2.50 g. of magnesium stearate and 32 g. of colloidal silicium dioxide are mixed in and the mixture is pressed into 10,000 tablets each weighing 100 mg. and containing 25 mg. of active substance. If desired, the tablets can be grooved to facilitate better adaptation of the dosage.

(b) A granulate is produced from 250 g. of N-(2-chloro-5-trifluoromethyl-phenyl-N'-ethyl urea, 175.90 g. of lactose and the alcoholic solution of 10 g. of stearic acid. After drying, this granulate is mixed with 56.60 g. of colloidal silicium dioxide, 165 g. of talcum, 20 g. of potato starch and 2.50 g. of magnesium stearate and the mixture is pressed into 10,000 dragée cores. These are then coated with a concentrated syrup of 502.28 g. of crystallised saccharose, g. of shellack, 10 g. of gum arabic, 0.22 g. of dyestuff and 1.5 g. of titanium dioxide and dried. The dragées obtained each weight 120 mg. and contain 25 mg. of active substance.

In addition, the compounds of general Formula I produced according to the invention can also be administered parenterally, in particular intravenously, in the form of aqueous dispersions which are produced with the aid of the usual pharmaceutically acceptable solubility promoters and/or emulsifying agents.

The following examples further illustrate the production of the new compounds of the general Formula I without limiting the scope of the invention in any way. The temperatures are given in degrees centigrade.

EXAMPLE 1

2000 ml. of dry benzene are placed in a stirring flask with exclusion of moisture. About 50 g. of gaseous methylamine dried over potassium hydroxide are introduced at a temperature of 5–10°. A solution of 221 g. of 2-chloro-5-trifluoromethyl penyl isocyanate in 1000 ml. of benzene is then added dropwise to this benzene solution of methylamine, while cooling. The mixture is then brought to room temperature and kept at this temperature for 4–5 hours. Excess methylamine and about ¾ of the benzene are then distilled off. About 500 ml. of petroleum ether are added to the residue whereupon the reaction product crystallises out. It is filtered off and, if desired, recrystallised from methanol with the addition of a little water. The N-(2-chloro-5-trifluromethyl-phenyl) - N' - methyl urea (N-[α,α,α-trifluoro-6-chloro-m-tolyl] - N' - methyl urea) so obtained melts at 143–144°.

EXAMPLE 2

On using 80 g. of dry ethylamine instead of the methylamine analogously to Example 1, N-(2-chloro-5-trifluoromethylphenyl)-N'-ethyl urea (N-[α,α,α-trifluoro-6-chlorom-tolyl]-N'-ethyl urea) is obtained. Recrystallised from methanol/water, it melts at 189–190°.

EXAMPLE 3

Also N-(2-chloro-5-trifluoromethyl-phenyl)-N'-n-butyl urea (N-[α,α,α-trifluoro - 6 - chloro-m-tolyl]-N'-n-butyl urea) is obtained analogously to Example 1 on using 90 g. of dry n-butylamine instead of the methylamine. Recrystallised from benzene, it melts at 126–127°.

EXAMPLE 4

A solution of 2-chloro-5-trifluoromethyl phenyl carbamic acid ethyl ester is produced as follows:

189 g. of 2-chloro-5-trifluoromethyl aniline are dissolved in 500 ml. of benzene and then 115 g. of ethyl chlorocarbonate and sufficient 5 N sodium hydroxide solution are added dropwise to this solution in such a way that the mixture always shows an alkaline reaction. Finally, it is stirred for 30 minutes at room temperature, always ensuring that the reaction is phenolphthalein alkaline, and then the aqueous phase is removed. The benzene solution is washed three times with 100 ml. of water each time and dried with sodium sulphate.

40 g. of methylamine (dissolved in benzene) are then added to the benzene solution of the carbamic acid ester and the whole is heated at 60° for 5 hours. The benzene solution is then concentrated to about half its volume whereupon the N-(2-chloro-5-trifluoromethyl-phenyl)-N'-methyl urea crystallises out on cooling. It is recrystallised from chlorobenzene as already described and then melts at 143–144°.

EXAMPLE 5

189 g. of 2-chloro-5-trifluoromethyl aniline are dissolved in 2000 ml. of chlorobenzene in a flask fitted with a stirrer. A solution of 60 g. of methyl isocyanate in 200 ml. of chlorobenzene is added dropwise while slightly cooling. To complete the reaction, the mixture is heated for 2 hours at 50–60°.

Most of the solvent is then distilled off in vacuo whereupon, on cooling, the residue solidifies in crystalline form.

It can be purified by recrystallization from methanol as described in Example 1. The N-(2-chloro-5-trifluoromethyl-phenyl)-N'-methyl urea obtained melts at 143–144°.

EXAMPLE 6

189 g. of 2-chloro-5-trifluoromethyl aniline are placed in a flask fitted with a stirrer and 50 g. of trichlorobenzene and 150 g. of N,N'-dimethyl urea are added. The mixture is then heated in an oil bath at 150–180° as long as the evolution of methylamine can be clearly recognized.

The reaction mixture is then cooled to about 70° and stirred with 500 ml. of hot water whereupon the reaction product solidifies in crystalline form. It is filtered off under suction and recrystallized, while still moist, from methanol.

The compound proves in every respect to be identical to that described in Example 1.

EXAMPLE 7

280 g. of N-(2-chloro-5-trifluoromethyl-phenyl)-N'-ethyl thiourea are suspended in a mixture of 1000 ml. of alcohol and 1000 ml. of water. 400 g. of freshly precipitated lead oxide are added and the whole is refluxed for 6 hours.

The mixture is then filtered while still hot whereupon, on cooling, the main part of the N-(2-chloro-5-trifluoromethyl-phenyl)-N'-ethyl urea formed crystallizes out. It is recrystallized from methanol/water, M.P. 189–190°.

EXAMPLE 8

The N-(2-chloro-5-trifluoromethyl-phenyl)-N'-methyl guanidine necessary for this reaction is obtained most easily from N-(2-chloro - 5 - trifluoromethyl)-phenyl)-N'-methyl thiourea, (produced from 2-chloro-5-trifluoromethyl aniline by reaction in the usual way with methyl mustard oil):

270 g. of thiourea are dissolved in 500 ml. of chlorobenzene and 400 g. of lead oxide are added. This suspension is saturated, with cooling, with gaseous ammonia and is then refluxed for 5 hours while still bubbling through ammonia. Lead sulphide and lead oxide are then filtered off and the filtrate is evaporated. The residue can be used directly for the following reaction:

247 g. of N-(2-chloro-5-trifluoromethyl-phenyl)-N'-methyl guanidine are dissolved in 1500 ml. of 5 N-hydrochloric acid. 70 g. of sodium nitrite are added in very small portions while stirring and slightly cooling (temperature 15–20°). The reaction is performed so slowly that no appreciable amount of nitrous gases develop from the reaction mixture.

On cooling, the N-(2-chloro-5-trifluoromethyl-phenyl)-N'-methyl urea precipitates in crystalline form. It is filtered off, washed with water and dried in vacuo. It is purified by recrystallisation analogously to Example 1. M.P. 143–144°.

EXAMPLE 9

233 g. of 2-chloro-5-trifluoromethyl urea are suspended in 250 g. of methyl acetamide and the suspension is heated for 15 hours at 200°. The greater part of the excess methyl acetamide is then distilled off in vacuo. The oily residue is taken up in 500 ml. of methanol and this solution, with 250 ml. of 4 N sodium hydroxide solution, is heated for 1 hour at 40–50°.

Most of the methanol is then distilled off in vacuo whereupon the N-(2-chloro-5-trifluoromethyl-phenyl)-N'-methyl urea formed precipitates. It is filtered off, washed with water and recrystallised from methanol, M.P. 143–144°.

I claim:

1. A pharmaceutical composition comprising an analgesically effective amount of a compound of the formula:

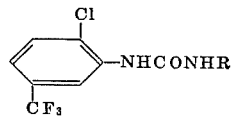

wherein R is methyl or ethyl, and a pharmaceutical carrier therefor.

2. A composition according to claim 1 wherein said compound is N-(2-chloro-5-trifluoromethylphenyl)-N'-methylurea.

3. A composition according to claim 2 wherein said compound is present in an amount of from 50 to 1000 mg.

4. A composition according to claim 1 wherein said compound is N-(2-chloro-5-trifluoromethylphenyl)-N'-ethylurea.

5. A composition according to claim 3 wherein said compound is present in an amount of from 50 to 1000 mg.

6. The method of treating pain in a mammal which comprises administering to said mammal an analgesically effective amount of a compound of the formula:

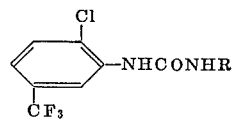

wherein R is methyl or ethyl.

7. The method of claim 6 wherein from 50 to 1000 mg. of N-(2-chloro-5-trifluoromethylphenyl)-N'-methylurea is administered orally.

8. The method of claim 6 wherein from 50 to 1000 mg. of N-(2-chloro-5-trifluoromethylphenyl)-N'-ethylurea is administered orally.

References Cited

UNITED STATES PATENTS 3,177,249   4/1965   Martin et al. _____ 260—553

ALBERT T. MEYERS, *Primary Examiner.*

S. J. FRIEDMAN, *Assistant Examiner.*